United States Patent [19]

Eberle

[11] 4,109,793

[45] Aug. 29, 1978

[54] AUTOMATIC AIR LEAK TESTING APPARATUS AND METHOD

[75] Inventor: William J. Eberle, Reading, Pa.

[73] Assignee: General Battery Corporation, Reading, Pa.

[21] Appl. No.: 770,889

[22] Filed: Feb. 22, 1977

Related U.S. Application Data

[60] Continuation of Ser. No. 600,840, Jul. 31, 1975, Pat. No. 4,027,797, which is a division of Ser. No. 475,273, May 31, 1974, Pat. No. 3,938,368.

[51] Int. Cl.$^2$ ............................................. B07C 9/00
[52] U.S. Cl. ................................. 209/74 R; 198/345
[58] Field of Search ................. 209/71, 72, 73, 74 R; 198/339, 343, 345; 271/250; 73/41, 45.1, 45.2, 45.4

[56] References Cited

U.S. PATENT DOCUMENTS

| | | | |
|---|---|---|---|
| 1,937,303 | 11/1933 | Worrall | 198/345 X |
| 3,170,572 | 2/1965 | Harrison | 209/74 R |
| 3,642,117 | 2/1972 | Burt | 209/111.7 R |
| 3,883,744 | 5/1975 | Steffel | 250/360 |

Primary Examiner—Joseph J. Rolla
Attorney, Agent, or Firm—Benasutti Associates, Ltd.

[57] ABSTRACT

Batteries are moved along a first roller type conveyor to a leak testing station, above which is located an assembly having a plurality of nozzles matable over battery cell inlets. A first set of alternate cells is supplied with air at a given pressure, and metering means notes pressure change. Thereupon, the remaining alternate cells receive the same treatment. If the cells do not leak, the battery advances from the testing station along the roller conveyor. If a leak is detected, a push bar connected to a cable system below the rollers ejects the battery transversely from the testing station along to a second conveyor, thereby isolating leaky batteries either for removal or further testing to locate more precisely the leak.

5 Claims, 9 Drawing Figures

AUTOMATIC AIR LEAK TESTING APPARATUS AND METHOD

This is a continuing application of application Ser. No. 600,840 filed July 31, 1975, now U.S. Pat. No. 4,027,797, which is a division of application Ser. No. 475,273, now U.S. Pat. No. 3,938,368, filed May 31, 1974.

BACKGROUND OF THE INVENTION

This invention relates to battery testing apparatus, and more particularly to automatic leak testing apparatus for determining the integrity of battery cells.

In U.S. patent application Ser. No. 286,067, filed Sept. 5, 1972, now U.S. Pat. No. 3,822,585 of Henry Toback, assigned to the assignee hereof, there is shown an air leak tester designed to be applied by hand to determine whether battery cells have leaks therein. More particularly, the Toback patent application describes a hand operated yoke having a plurality of nozzles adjustable to fit over alternate cell inlets. Air is forced into those alternate cells and a meter notes changes of pressure which indicate air leaks. Thereupon, the remaining alternate cells are similarly tested.

Hand operated leak testers such as that described in the Toback patent application, although technically sound, necessarily introduce the danger of human error. Said otherwise, notwithstanding the clear technical advances embodied in the Toback patent application, it is a fact of life that fallible human operators may be counted upon occasionally to use the apparatus improperly. When such mishaps occur, the efficiency of the battery assembly line will be substantially impaired, whether a leaky battery was not detected or whether a perfectly good battery was rejected. The economic disadvantage of the latter case is clear, and the former may even involve safety risks, in view of the acid content and noxious gas emitting tendencies of batteries.

It is accordingly a primary object of the present invention to provide substantially automatic air leak testing apparatus for use in a battery production line.

It is a further object to provide an automatic mechanism for isolating defective batteries from the main processing or production line once defects have been detected therein.

SUMMARY OF THE INVENTION

The present invention fulfills the foregoing and other substantial functional objectives by providing an automatic air leak testing station and method of operating same in which batteries are first positioned for testing, are automatically tested by injection of controlled pressure air, are automatically determined to be either leaky or not, and the leaky batteries are automatically isolated from the production line, while the others are passed on for further processing.

In an illustrative embodiment, batteries being processed are passed along a conveyor comprising parallel rollers, which conveyor bifurcates at a point defined by the air leak testing station. In particular, by means of upwardly pivoting rollers, one battery is positioned for testing and the remainder are retained from further advancement along the conveyor. An assembly including a yoke and a plurality of nozzles is matably positioned over the cell inlets, and a first group of alternate cells is pressurized with air passing in through the yoke. Associated pressure metering means determines whether an air leak has occurred in any of the pressurized cells, after which the air pressure is returned to normal and the remaining series of alternate cells is likewise pressurized and tested. When this pressurizing and testing process occurs, the assembly is removed upwardly, and depending upon whether the battery was detected as having leaks or not having leaks, it is either passed down the production line for further processing, or is isolated for scrap or for further investigation and repair of the air leaks. The bifurcation of the conveyor occurs at the processing station by means of elongated rollers which span two substantially parallel conveyors, the first being the continuation of the main production line, and the second being reserved for isolation of leaky batteries. A continuous loop cable beneath the elongated rollers is connected to a push rod extending upwardly and contacting the batteries. Whenever a leaky battery is detected, the cable system is energized and, by means of the push rod, the battery is moved along and parallel to the elongated rollers onto the second conveyor, where it is passed on for scrap or investigation of the leak as aforementioned.

The structural details of the foregoing illustrative embodiment, along with methods of utilizing same, will be more clearly understood upon consideration of the following drawings and detailed description thereof.

DETAILED DESCRIPTION

Figure 1:
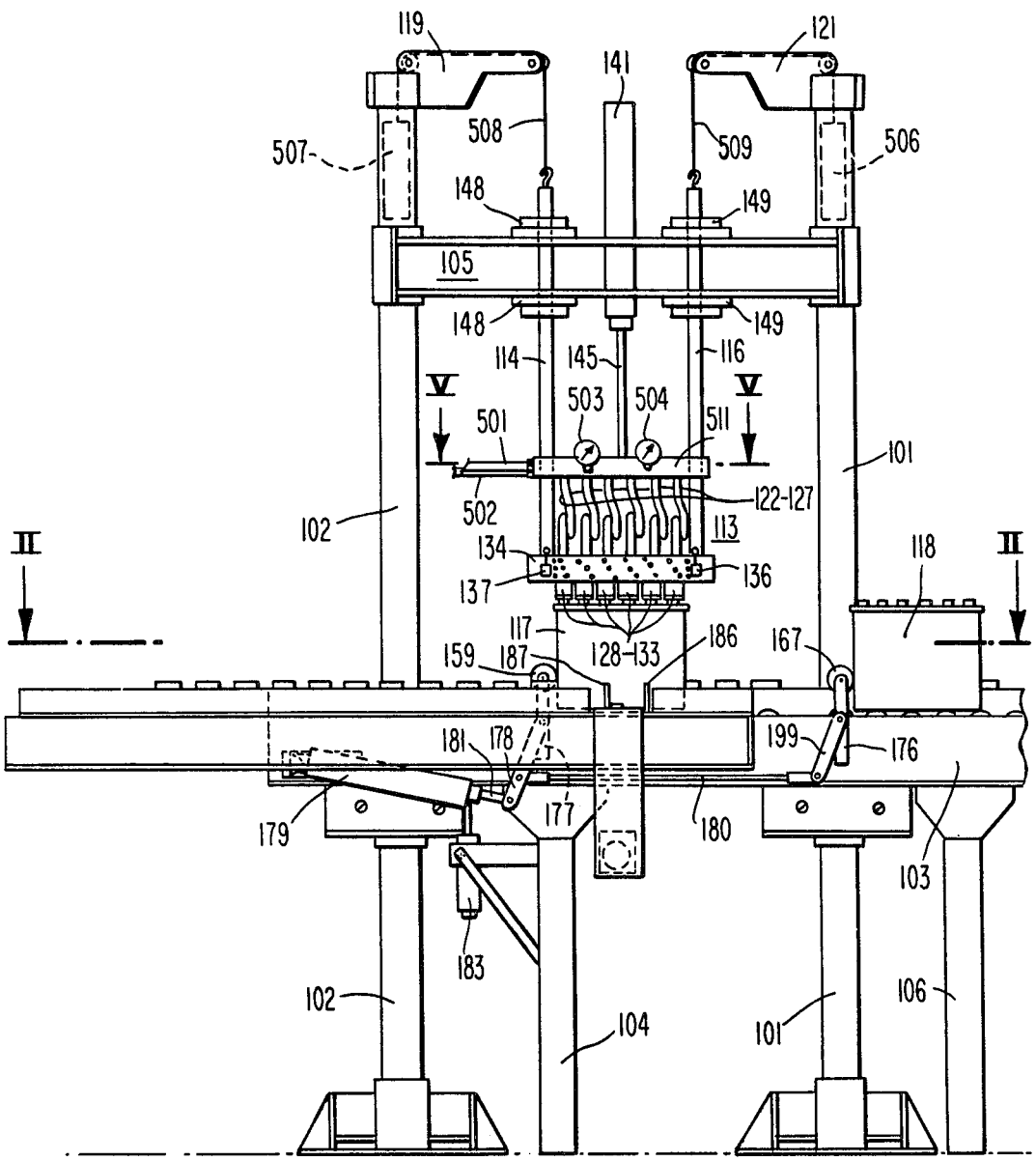
FIG. 1 shows a frontal view of an automatic air leak testing station which embodies the principles of the present invention.

In FIG. 1, an automatic air leak testing station is primarily defined by vertical support members 101 and 102 which are positioned and supported by means of a transverse structural member 105 and by a bifurcated roller system including vertical supports 104 and 106. Batteries such as 118 and 117 pass along the roller system 103 for testing at the station, which testing occurs in a position under the testing assembly 113 as defined by stop roller 159. The assembly 113 includes a plurality of nozzles 128 through 133 matable over the ports of a battery such as 117 and coupled to air feed hoses 501 and 502 and to meters 503 and 504 by means of a corresponding plurality of conduits 122 through 127. The assembly 113 is vertically movable by means of rods 114 and 116, bearing assemblies 148 and 149, a pair of counterweights 506 and 507, and an air cylinder and piston assembly 141 and 145.

Figure 2:
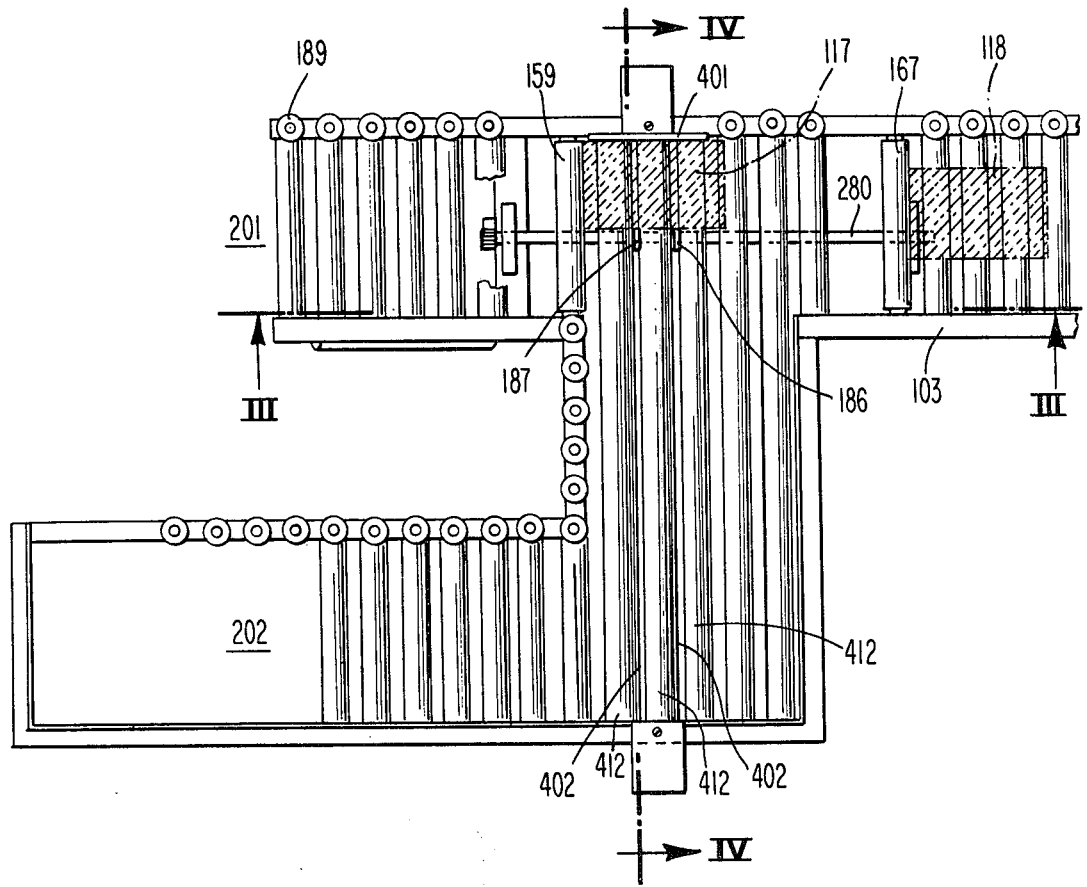
FIG. 2 shows a top view of a bifurcated roller type conveyor which forms a portion of the station of FIG. 1, and FIGS. 3 and 4 show cutaway views thereof, FIG. 4 particularly including a continuous cable automatic reject system.
Figure 3:
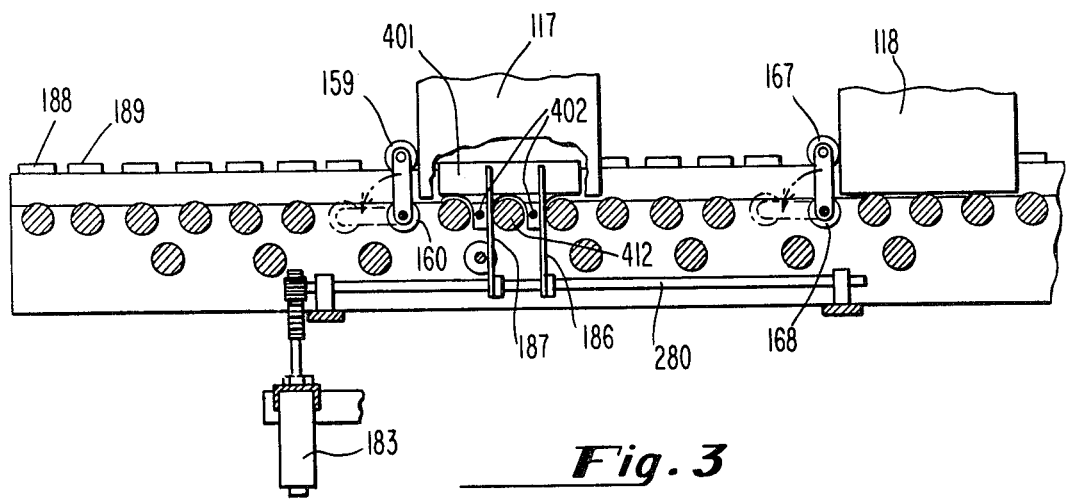

As may be most clearly understood from FIGS. 1 through 3, the mechanism whereby a battery such as 117 is positioned for testing, and whereby other batteries such as 118 are precluded from interfering with the testing process, is the use of upwardly pivotable rollers from the conveyor which thereby serve as stop mechanisms along the conveyor. Thus, under control of a cylinder 179 and piston 181, through connections of lever arms 178 and 199 and tie rod 180, rollers 159 and 167 may be pivoted upwardly and over their next adjacent rollers 160 and 168, respectively, thereby forming a stop for batteries 117 and 118 as shown. Whenever air pressure in the cylinder 179 is increased, the piston 181 moves outwardly, along with tie rod 180, and rollers 159 and 167 again move downwardly into the positions shown in phantom in FIG. 3; batteries 117 and 118 are then free to move along down the conveyor.

Once a battery such as 117 is in abutment with the pivoted roller 159, as shown, two fingers 187 and 186 are pivoted upwardly and between the rollers, against the battery 117, and further until the battery 117 is locked into place in a predetermined position against the horizontal portion 401 of the reject mechanism, the operation of which is detailed hereinafter. As may be seen most clearly from FIG. 3, the upward pivoting of fingers 187 and 186 occurs by means of yet another cylinder and piston arrangement 183, energized by means of appropriate control systems, not shown, and through the shaft 280.

Whenever the battery 117 is so positioned, the leak testing assembly, generally designated 113, may be lowered into place such that the nozzle assemblies 128 through 133 mate with the various inlet ports of the battery 117. This occurs chiefly by means of the cylinder 141 and piston 145 arrangement which is connected to the upper port of the assembly 113. In order to facilitate this operation, the assembly 113 includes upwardly depending rods 114 and 116 which are connected, by means of lines 508 and 509, respectively, to a pair of counterweights 507 and 506 located conveniently within the upper portion of vertical support members 101 and 102. In preferred embodiments, the rods 114 and 116 pass through bearing assemblies 148 and 149, and the lines 508 and 509 pass over pulleys located on cantilever support arms 119 and 121. By means of the counterweights 506 and 507, the assembly 113 may also be kept in a nearly balanced condition, such that minimal force is necessary from the cylinder 141 and piston 145 for either upward or downward movement.

The structure of the assembly 113 may be appreciated in its more detailed aspects by consideration of FIGS. 5 through 8. The upper part of the assembly 113 is defined by a transverse yoke member 511 which is connected as shown to the rods 114 and 115 and the piston rod 145 from the cylinder 141. Within the yoke 511 are conduits 512 and 513 which are coupled respectively to air inlet hoses 501 and 502, and which also are connected respectively to a pair of air pressure meters 503 and 504. The conduit 513, which is supplied by air hose 502 and monitored by pressure meter 503, is coupled as shown through three supply hoses 123, 125, and 127 to the nozzles 129, 131, and 133. Likewise, the other conduit 512 is connected to the inlet hose 501, monitored by the meter 504, and coupled to the air hoses 122, 124, and 126.

Figure 7:
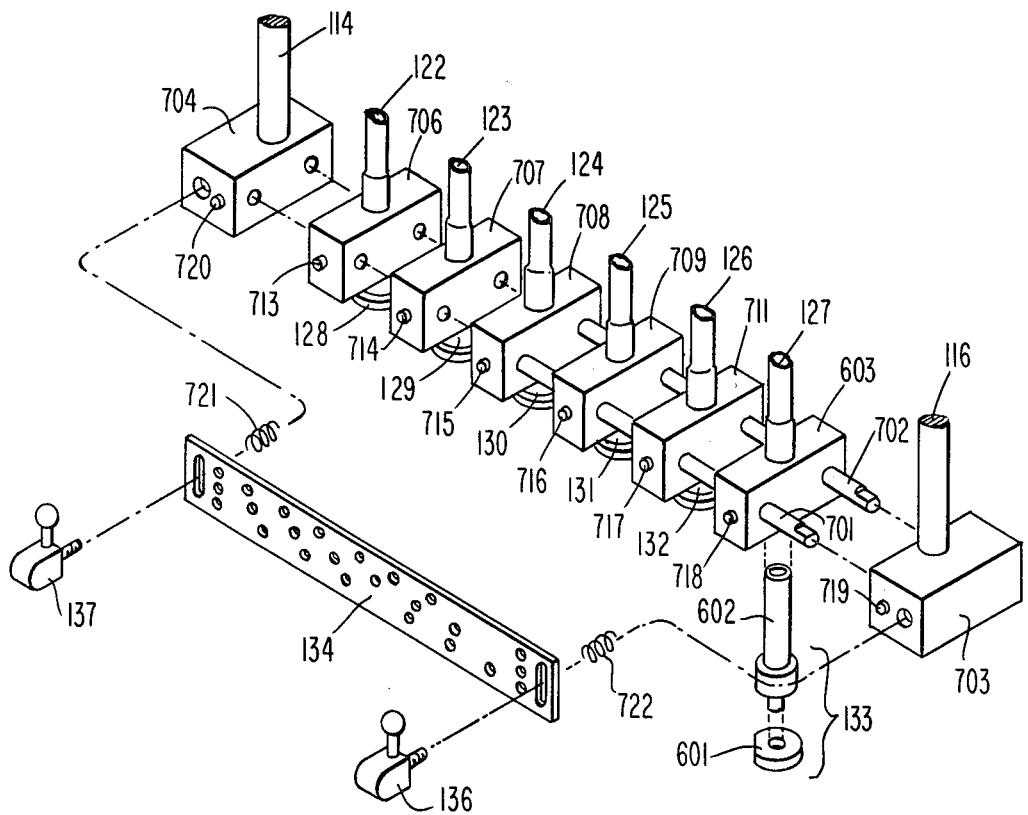
Figure 8:
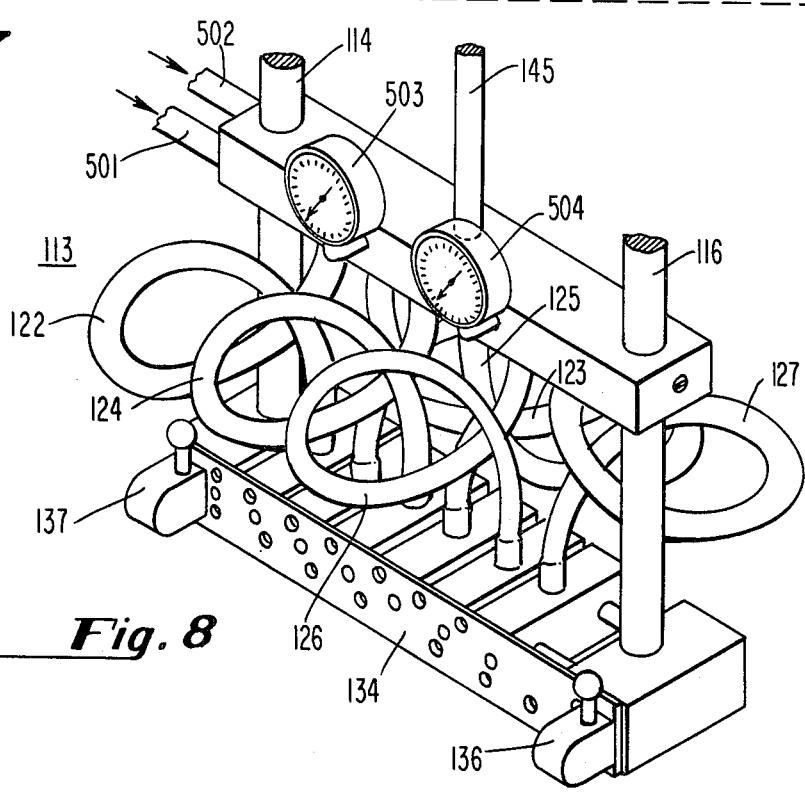
Figure 9:
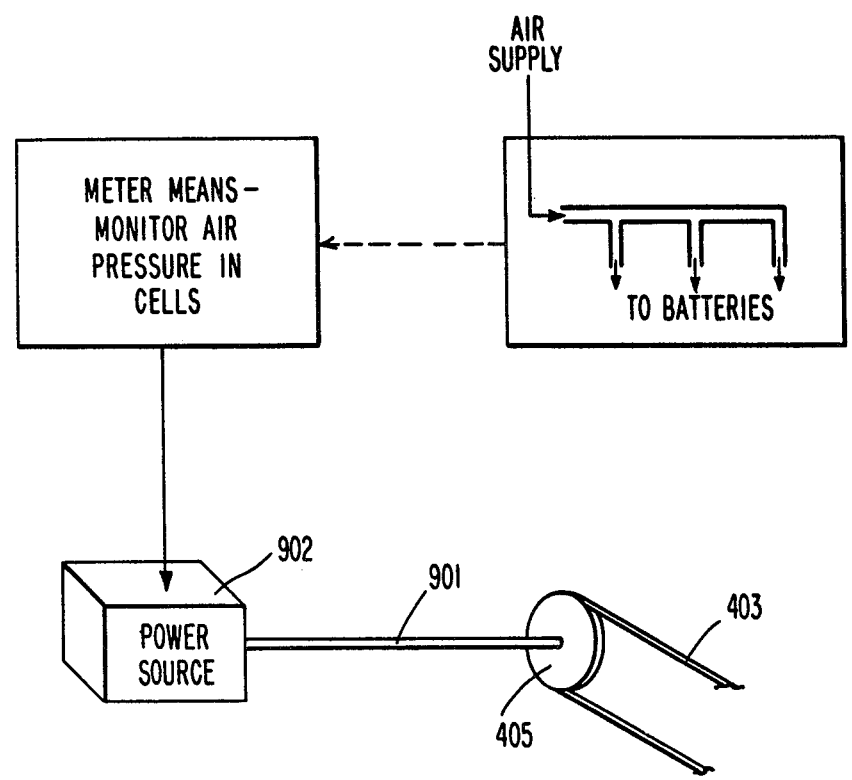
FIG. 9 shows the interaction of the rejection apparatus with the air pressure metering means.

As may perhaps be best appreciated from the exploded view of FIG. 7, the end blocks 703 and 704 are mounted on rods 114 and 116 which permit upward and downward movement of the various blocks 706 through 711 and 603 under control of the cylinder 141 and piston 145. Each of the blocks 706 through 711 and 603, respectively, is coupled at a top end to one of the air supply hoses 122 through 127 by means of a sleeve type connection. Likewise, each of the blocks 706 through 711 and 603 is penetrated by an opening extending downwardly through to the bottom and connected to the nozzles 128 through 133. Thus, when the whole assembly 113 is lowered over a battery to be tested, air from the inlet hoses 501 and 502 passes through various conduits in the yoke, downwardly through the air supply hoses 122 through 127, through the various blocks 706 and 711 and 603, and into the batteries through matable nozzles 128 through 133.

Each of the blocks 706 through 711 and 603 includes an outward protuberance 713 through 718, respectively, on an outer face thereof. Likewise, the end blocks 703 and 704 include similar protuberances 719 and 720. The relative positioning of all of the blocks 706 through 711 and 603 on the rods 701 and 702 is established by the penetration of the protuberances 713 through 720 in appropriately spaced guide holes on an overlaying face place 134. As may be seen from the drawing, the plate 134 includes horizontal sets of holes at various spacings, each horizontal set corresponding to a different battery inlet port configuration. Thus, when the plate 134 is attached to the end blocks 703 and 704 by means of keys 136 and 137 and springs 722 and 721, protuberances 719 and 720 on the end blocks 703 and 704 are established in corresponding ones of the holes in the plate 134. Positioning in such manner of protuberances 719 and 720 thereby establishes unique positioning for protuberances 713 through 718 in corresponding predetermined spaced openings on the plate 134. Accordingly, such positioning of the plate on the end blocks 703 and 704 conclusively establishes spacings of the blocks 706 through 711 and 603, and thereby of the nozzles 128 through 133. Hence, any predetermined spacings and numbers of openings in the plate 134 may be utilized to adapt the assembly 113 for testing of batteries of any size and number of cells.

Figure 6:
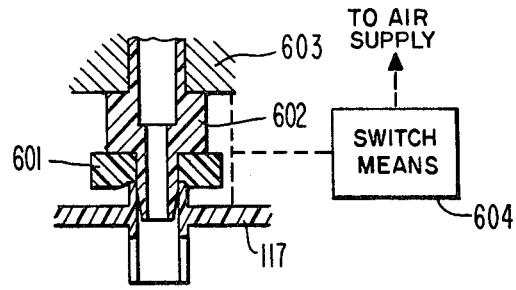
FIGS. 6, 7, and 8 show various views of an assembly for air leak testing to be utilized in the embodiment of FIG. 1.

As is most clearly shown in FIG. 6, each of the nozzles 128 through 133 is made up of a nozzle portion 602 which is fit upwardly into the blocks, such as 603, and a washer portion 601 made of some deformable material which permits an air tight connection of the assembly with the battery inlet port. Deformation of the washer such as 601 occurs under pressure of the whole assembly 113 being lowered over the battery. At that time, the entire arrangement is in the position shown in FIG. 1, and ready for the actual testing operation.

A preferred mode for operation of the embodiment described is similar to that set forth in the foregoing patent of Toback, wherein alternate sets of battery cells are tested simultaneously, after which the intervening alternate cells are so tested. Accordingly, once the assembly is positioned against the battery top, air is supplied through one of the inputs, such as 501, through the associated conduit, such as 512, and downwardly into the three battery cell cavities fed by hoses 122, 124, and 126 and correspondingly by nozzle assemblies 128, 130 and 132. When a predetermined amount of air has been thus coupled into the alternate cells of the battery, it may be determined by the associated meter, 504, whether that pressure remains stationary or, by means of a leak, dissipates at an undesired rate. Such pressure monitoring by the meter 504 will be used, as described hereinafter, to energize the other mechanisms, as desired, depending upon whether the tested cells are found to be leaky or not. Thereupon, those cells are depressurized, and by a similar process, pressurized air is provided by inlet hose 502 through the conduit 513, the hoses 123, 125, and 127, and the nozzles 129, 131 and 133. Pressure in those cells is similarly monitored by metering means 503. Once the testing process is thusly completed, the entire assembly 113 may be lifted upwardly from the battery, and, depending upon whether the battery was found to be leaky or not leaky, appropriate mechanisms may be energized either to pass a battery on for further production, or to isolate leaky batteries from the processing apparatus.

Figure 4:
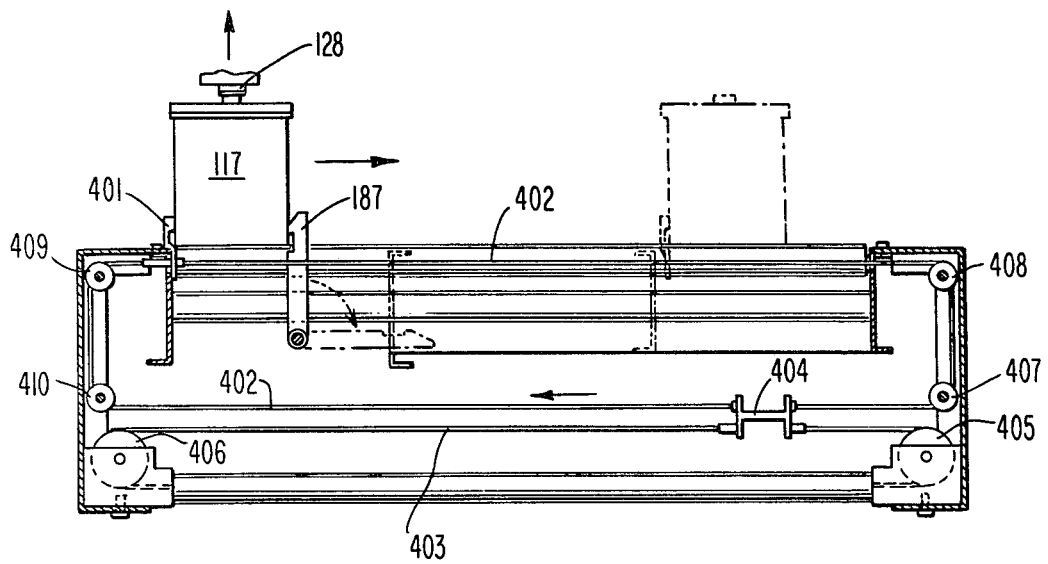
Figure 5:
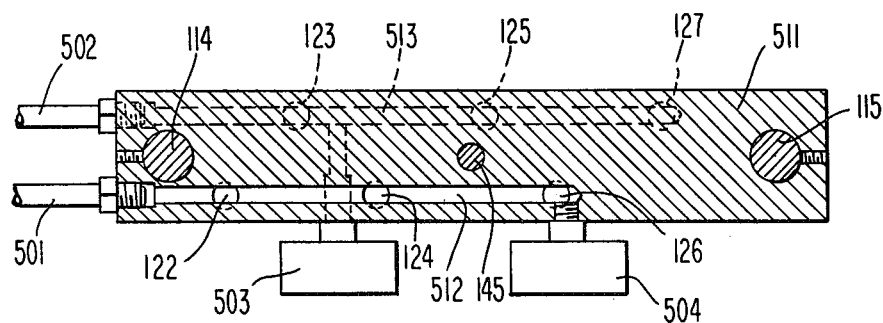
FIG. 5 shows a yoke whereby air is coupled to batteries for testing.

FIG. 4 is believed most clearly to show suggested apparatus for the isolation of the batteries, in accordance with the conveyor design exemplified in FIG. 2. Located directly beneath the elongated rollers such as 412 which span the two conveyor segments 201 and 202 is control apparatus for shifting batteries from one conveyor to the other. More particularly, beneath roller 412 are first and second cable loops 402 and 403 which are interconnected by means of an adjustable link 404. In turn, the lower cable 403 passes over wheels 405 and 406, and the upper cable passes over pulleys 407 through 410. Mounted along the upper cable 402 by an appropriate link or pin mechanism is a push member 401. One or both of the wheels 405 and 406 is connected by means of appropriate gear, belt, or other transmission apparatus 901 to a power source 902, such that when the wheels are turned in a counterclockwise direction, the link 404 is moved toward conveyor 201, and when wheels 405 and 406 are turned in a clockwise direction, link 404 is moved toward conveyor 202. Correspondingly, as link 404 moves from beneath conveyor 202 to a point beneath conveyor 201, the push mechanism 401 moves in the opposite direction, thereby carrying an associated battery 117 from beneath the leak testing assembly 113 to the second conveyor 202, as shown in phantom in FIG. 4. Thereupon, reversing the direction of wheels 405 and 406 reinstates the push mechanism 401 back in position to receive another battery for processing.

The mechanism shown in FIG. 4 for removing batteries from conveyor 201 to conveyor 202 serves as an automatic reject mechanism for removal of batteries ascertained to be leaky from the normal production line to a separate place, exemplified by conveyor 202, either for treatment as scrap, discarding, or investigation for discovery and repair of leaks. Accordingly, the power mechanism 901 and 902 which turns wheels 405 and 406 and which thereby operates the push mechanism 401 is energized by detection of a leak by meters 503 or 504 after associated cells have been pressurized as described hereinbefore.

While the apparatus herein described may be utilized in various sequences of operation, a preferred mode is as follows. Assuming the pivotable rollers 159 and 167 to be in a downward position on the conveyor 201, passage of a battery such as 117 beyond the area of upward standard 101 is detected by sensing means, not shown (such apparatus may involve a photocell receiving a light beam passing across the conveyor 201, mechanical means sensing passage of the battery thereby, electrical or electronic sensing systems, or other appropriate apparatus), cylinder 179 is energized to pivot rollers 159 and 167 upwardly as shown in FIG. 1. A battery for testing is thereby isolated, and other batteries are held in readiness for subsequent testing. Once the battery such as 117 is resting against upward pivoted roller 159, cylinder 183 is energized by other appropriate sensing mechanisms, not shown, and by means of fingers 186 and 187, the battery is locked into place for testing. Thereupon, the assembly 113 is lowered downwardly until the nozzles 128 through 133 mate with inlet ports of the battery, and in succession as shown hereinbefore, alternate series of cells are pressurized and the pressure changes therein monitored, to determine whether a leak has been found. If all cells are found not to be leaky, rollers 159 and 167 are pivoted downwardly to form a portion of conveyor 201, fingers 186 and 187 release the battery from pressure, and the tested battery advances for subsequent processing, while another battery is introduced for further testing. If one or more of the cells was found to be leaky, fingers 186 and 187 are pivoted downwardly but rollers 159 and 167 remain in place. Then, the cable mechanism 402 and 403 is energized to move the battery across elongated rollers such as 412 onto the second conveyor 202. Pivotable rollers 159 and 167 may thereupon be downwardly pivoted to allow introduction of a new battery for testing, whereupon the procedure is repeated.

While in the foregoing method, various production steps were energized by sensing mechanisms, it will be apparent that many steps may be amenable to automatic sequential control utilizing appropriate apparatus, not shown. Such modifications are well within the scope of the present invention.

Likewise, many other minor modifications may be made without departing from the spirit or scope of the principles of the present invention. Likewise, some apparatus may be removed or additional apparatus may be added in accordance with the abilities of those ordinary skilled in the art.

I claim:

1. In an automotive battery production system, apparatus for selectively isolating automotive batteries comprising:
    (a) a first conveyor means for advancing batteries and having defined thereon a battery processing position at which each battery is to be subjected to a preselected process;
    (b) means for sequentially isolating and positioning each of said batteries at said battery processing position for a predetermined length of time; said means including means located at said battery processing position for positioning at said battery processing position each of said batteries in a first direction along a path which is transverse to the direction of advancement of said batteries;
    (c) a second conveyor means for advancing select ones of said batteries, said second conveyor means communicating with said first conveyor means adjacent said battery processing position; and
    (d) reject means responsive to results of said processes, for selectively moving batteries from said battery processing position along said path in the opposite direction with respect to said first direction to move said batteries from said first conveyor means to said second conveyor means.

2. The invention of claim 1 wherein said first conveyor means further comprises a plurality of substantially parallel rollers, said means including means for positioning each of said batteries in a first axial direction at said position with respect to the longitudinal axes of said rollers; said second conveyor means for advancing select ones of said batteries further comprising a plurality of substantially parallel rollers, at least a portion of which rollers are longer than the other rollers of said second conveyor means, said longer rollers also comprising rollers of said first conveyor means to extend substantially across both conveyor means at said battery processing position; said movement of batteries at said position in the opposite direction with respect to said first direction producing movement of said batteries from said first conveyor means to said second conveyor means substantially axially along said rollers extending across both conveyor means.

3. In an automotive battery production system, apparatus for selectively isolating automotive batteries comprising:
(a) A first conveyor means for advancing batteries and having defined thereon a battery processing position at which each battery is to be subjected to a preselected process;
(b) means for sequentially isolating and positioning each of said batteries at said battery processing position for a predetermined length of time; said means including means located at said battery processing position for positioning at said battery processing position each of said batteries in a first direction along a path which is transverse to the direction of advancement of said batteries, said means for positioning each of said batteries in a first axial direction comprising at least one member movable to a position above the surface of said first conveyor means for positioning each of said batteries in a first direction and movable at least in response to said reject means to a position substantially below the surface of said first conveyor means to allow said selective movement of batteries at said position in the opposite direction with respect to said first direction;
(c) a second conveyor means for advancing select ones of said batteries, said second conveyor means communicating with said first conveyor means adjacent said battery processing position; and
(d) reject means responsive to results of said processes, for selectively moving batteries from said battery processing position along said path in the opposite direction with respect to said first direction from said first conveyor means to said second conveyor means.

4. The invention of claim 3 wherein said member is pivotally mounted at a point disposed substantially below said first conveyor.

5. The invention of claim 4 wherein said member comprises a plurality of fingers, said fingers being mounted on a rod, the rotation of said rod effecting movement of said fingers.

* * * * *